No. 826,470. PATENTED JULY 17, 1906.
V. M. BRASCHI.
FLEXIBLE BAKING TRAY.
APPLICATION FILED AUG. 29, 1905.

WITNESSES:

INVENTOR
Victor M. Braschi
BY
his ATTORNEYS

UNITED STATES PATENT OFFICE.

VICTOR M. BRASCHI, OF MEXICO, MEXICO.

FLEXIBLE BAKING-TRAY.

No. 826,470.          Specification of Letters Patent.          Patented July 17, 1906.

Original application filed March 28, 1905, Serial No. 252,550. Divided and this application filed August 29, 1905. Serial No. 276,217.

*To all whom it may concern:*

Be it known that I, VICTOR M. BRASCHI, a citizen of the United States of America, and a resident of the city of Mexico, Mexico, have invented certain new and useful Improvements in Flexible Baking-Trays, of which the following is a specification, reference being had to the accompanying drawings, forming a part thereof.

My invention consists in a baking-tray comprising a thin flexible metallic sheet so arranged, constructed, and designed that the tray may be flexed backward and forward for the purpose of stripping off material under treatment thereon.

The device is intended for receiving tortillas or similar articles of food which are to be cooked by the application of heat beneath the tray. Tortillas, which are a staple article of food in Mexico, are thin meal cakes, usually about five to six inches in diameter and about one-sixteenth to one-eighth of an inch thick. These cakes are cooked for a certain length of time on one side and should then be turned over, so as to be cooked on the other side. The usual method of turning the cakes over is to insert a thin flat instrument known as a "slice" beneath the cake, whereby same may be picked up and then turned over. It will be understood that the cakes are of such a constituency as to stick to the tray, so that the mere inversion of the tray would not effect their removal. I have therefore devised a flexible tray, whereby upon inversion the tray may be worked backward and forward above another tray, the effect being to loosen the cakes sufficiently for them to drop off and to fall upon the tray arranged beneath them. By this arrangement I am able to save the time usually employed in turning the cakes, which in preparing a large number is quite a desideratum.

In order that my invention may be fully understood, I will now describe, with reference to the accompanying drawings, an embodiment thereof and will then point out the novel features in the claims.

Figure 1:
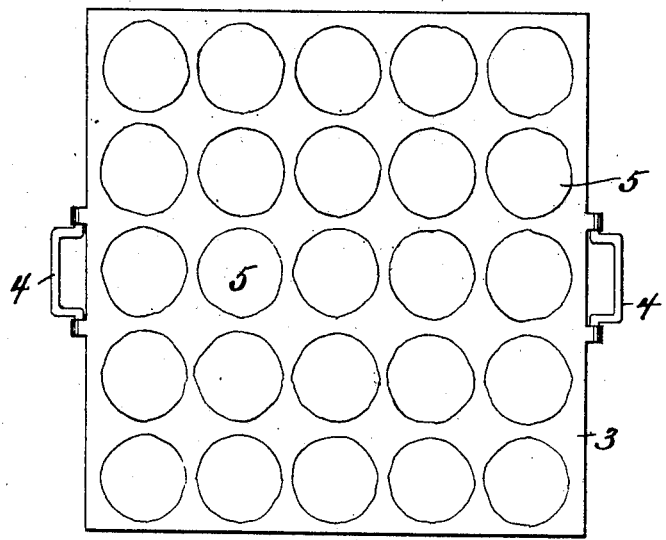
Figure 2:
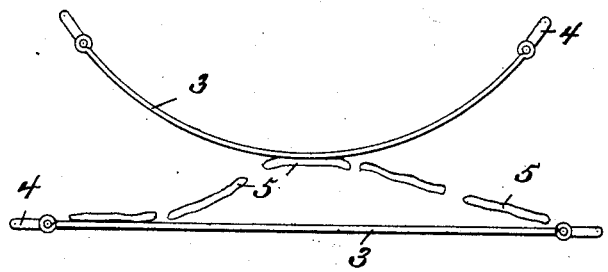

In the drawings, Figure 1 is a face view of a tray, showing the same supporting a plurality of tortillas or similar articles of food. Fig. 2 is an edge view of two of the trays, showing the upper tray as flexed and the tortillas as falling from the upper to the lower tray.

3 designates the tray, which is preferably rectangular in form and may conveniently be made of thin sheet-iron or other suitable material. It is provided along two of its opposite edges with pivoted handles 4, such handles projecting laterally, so that the tray may be used indifferently upon opposite sides. In Fig. 1 the tray is shown as supporting a number of tortillas 5. To remove these tortillas, which as a result of their nature adhere with considerable persistency to the tray, the tray may be inverted and flexed backward and forward. The tortillas will by this be caused to fall away from the tray, and if another tray be supported beneath the tray from which the tortillas are removed they will fall upon the lower tray in substantially the order in which they came from the first-named tray. This operation is illustrated in Fig. 2.

While I have described my tray as particularly adapted for use in cooking tortillas, it will of course be understood that it may be employed for cooking other articles.

In actual practice a suitable support is provided for the tray above the fire, so that at such time the tray is prevented from flexing while the flames directly impinge beneath same. I have shown one form of such support in a copending application filed simultaneously herewith, but have not shown or described it in detail herein as forming *per se* no part of the present invention. I have also shown a form of support for the said tray and have shown and described the tray in detail in an application filed March 28, 1905, Serial No. 252,550, of which this is a divisional application.

What I claim is—

1. A baking-tray comprising a flexible metallic sheet, whereby the tray may be flexed backward and forward for the purpose of stripping off the material under treatment thereon, substantially as specified.

2. A baking-tray comprising a flexible metallic sheet provided with laterally-projecting handles whereby the tray may be flexed backward and forward for the purpose of stripping off the material under treatment thereon.

3. A baking-tray comprising a flexible metallic sheet provided with laterally-projecting pivoted handles whereby the tray may be flexed backward and forward for the purpose of stripping off the material under treatment thereon.

VICTOR M. BRASCHI.

Witnesses:
D. HOWARD HAYWOOD,
C. F. CARRINGTON.